United States Patent [19]
Peterson

[11] 3,928,859
[45] Dec. 23, 1975

[54] SHUTTER-IRIS FOR AUTOMATIC CAMERA
[75] Inventor: Dean M. Peterson, Littleton, Colo.
[73] Assignee: Honeywell Inc., Minneapolis, Minn.
[22] Filed: Mar. 22, 1974
[21] Appl. No.: 453,888

[52] U.S. Cl. .................. 354/27; 354/42; 354/49; 354/228
[51] Int. Cl.² .................. G03B 7/14; G03B 9/00
[58] Field of Search .................. 354/26–30, 354/33, 44, 50, 230, 247, 228, 42, 49, 51

[56] References Cited
UNITED STATES PATENTS

| | | | |
|---|---|---|---|
| 3,624,725 | 11/1971 | Kobayashi et al. | 354/27 |
| 3,641,889 | 2/1972 | Eloranta | 354/42 |
| 3,672,267 | 6/1972 | Harvey et al. | 354/29 |
| 3,690,228 | 9/1972 | Yamashita et al. | 354/49 |
| 3,744,385 | 7/1973 | Burgarella et al. | 354/51 |
| 3,820,131 | 6/1974 | Tanaka | 354/50 |
| 3,832,722 | 8/1974 | Douglas | 354/29 |

*Primary Examiner*—Richard A. Wintercorn
*Attorney, Agent, or Firm*—Arthur H. Swanson; Lockwood D. Burton

[57] ABSTRACT

An automatic camera features automatic focusing apparatus including a reversible electric motor for effecting the focusing of the camera when the motor is energized for operation in one direction. Also featured is an automatic exposure control system including a pair of shutter blades arranged for oppositely directed translational movement, the blades having configured openings which may be brought partly or wholly into alignment with each other to admit a predetermined amount of light to the film chamber of the camera. The automatic exposure control system also includes a photosensitive element in the film chamber to sense the amount of admitted light and to effect the required control. The reversible motor, when energized for operation in the opposite direction, is effective to simultaneously reset its shutter mechanism and to advance the film in the camera to the next film frame position. Still another feature is a self-contained electronic flash unit. Means are provided for automatically readying the flash unit for each picture. Early in the execution of the picture taking operation, the ambient light is sampled. If insufficient ambient light is available for a proper exposure of the film in the camera, the flash unit is triggered into operation at a time coordinate with the focus adjustments of the camera.

18 Claims, 11 Drawing Figures

SHUTTER-IRIS FOR AUTOMATIC CAMERA

CROSS REFERENCE TO RELATED APPLICATION

A copending application of Francis T. Ogawa for Control Circuit, filed on June 28, 1973, Ser. No. 374,691, describes and claims a control circuit for controlling the operation of a camera of the type herein described and claimed.

BACKGROUND OF THE INVENTION

1. Field of the Invention

The present invention relates to photographic apparatus. More particularly, it relates to a photographic camera featuring automatic operation.

2. Description of the Prior Art

Heretofore many structures have been devised for providing what was called automatic camera operation. These include means for adjusting the iris or light admitting aperture in response to signals derived from the illumination of the scene to be photographed. Similarly, means have been provided for automatically adjusting the shutter opening or exposure time in response to signals derived from the illumination of the scene to be photographed. In fact, some camera arrangements have been provided which include both adjustments. Such structures previously provided have been complex, involving many parts, and as a result were necessarily expensive to produce. When, in such prior art structures, adjustment of both exposure time and aperture were provided, separate means were provided for effecting the two control functions. In some cases, shutter blades were used to provide both the aperture opening and the timed shutter operation. However, in those cases a very complex structure was provided for effecting the necessary control. In many prior art camera structures, switch means were provided for effecting the actuation of an associated flash illumination device whenever such flash illumination device was connected to the camera. Such, switch means, of course, were properly synchronized to match the shutter operation with the particular type of flash unit employed. In such cases, whenever the flash unit is properly connected to the camera, the light will be flashed each time the shutter is actuated. On the other hand, if the flash unit is not connected to the camera member, no auxiliary light will ensue, even if the ambient light is insufficient for a proper photograph. Other cameras have provided a motorized cocking and film advance mechanism. Such mechanisms however were generally bulky, complex, and not completely automatic.

SUMMARY OF THE INVENTION

It is accordingly an object of the present invention to provide an improved camera which obviates the short comings of prior art so-called automatic cameras.

It is another object of the present invention to provide an improved automatic camera as set forth which features an improved shutter-iris mechanism.

It is a further object of the present invention to provide an improved camera as set forth and including a programmed shutter system.

It is yet another object of the present invention to provide an improved camera as set forth wherein the programming means includes controls for an auxiliary light source.

A still further object of the present invention is to provide an improved camera as set forth which includes means for automatically resetting the camera mechanism after each exposure and advancing the film to the next film frame position.

Yet another object of the present invention is to provide an improved camera as set forth which further includes means for automatically focusing the camera prior to effecting the operation of the shutter mechanism.

A yet further object of the present invention is to provide an improved camera as set forth which, although nearly completely automatic in operation, is nevertheless relatively simple in construction.

In accomplishing these and other objects there has been provided in accordance with the present invention a camera which has a relatively simple two blade shutter-iris mechanism. Each blade of the mechanism includes a configured opening which, under the influence of a control mechanism may be brought partially or wholly into alignment with the other to define both aperture dimension and exposure time for the shutter mechanism. An internal electric motor is arranged to respond to control signals to first effect a focusing of the lens system of the camera before the shutter mechanism is actuated. Then, after the shutter has been actuated to effect a proper exposure of the film in the camera, the motor is controlled to effect an advancement of the film to the next film frame and at the same time to reset the camera mechanism in readiness for subsequent exposure. An auxiliary or artificial light source means is included as a built-in feature of the camera. The programmatic control system of the camera includes means for effecting an actuation of the auxiliary light means whenever the ambient light falling on the scene is insufficient for a proper exposure.

DESCRIPTION OF THE PREFERRED EMBODIMENT OF THE INVENTION

Figure 1A:
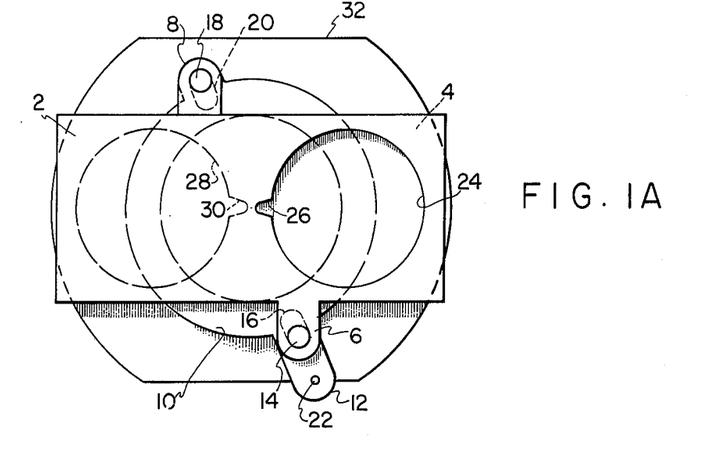
FIGS. 1A, 1B, and 1C are elevational views showing three different positions of a camera shutter blade structure constructed in accordance with the present invention.
Figure 1B:
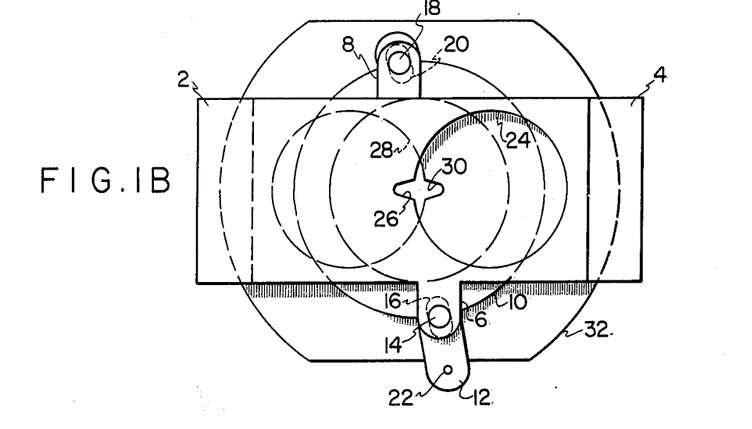
Figure 1C:
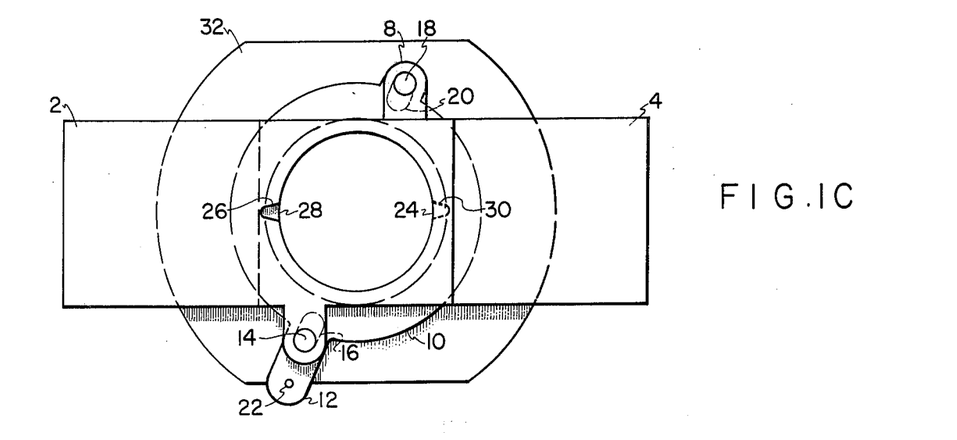

In FIGS. 1A through 1C, there is illustrated the details of a shutter mechanism constructed in accordance with the present invention which comprises a first shutter blade 2 and a second shutter blade 4. The two shutter blades are arranged for straight line translational movement in opposite directions along the line parallel to the major dimension of the two blades. To this end, the first blade 2 is provided with a tang or extension 6 which extends outwardly from the lower edge of the blade. Similarly, the second blade 4 is provided with a tang or extension 8 which extends upwardly from the side of the blade. A driving ring 10 is positioned adjacent and parallel to the blades 2 and 4. The ring 10 is also provided with a tang 12 which extends radially with respect to the driving ring 10. A pin 14 carried by the tang 16 engages a radial slot 16 in the driving ring 10. Similarly, a pin 18 engages a slot 20 in the ring 10. The tang 12 of the ring 10 at its outer extremity has an opening 22 therethrough. As will be shown hereinafter a driving link is coupled to the tang 12 through the opening 22 to effect an angular or rotational displacement of the ring 10. Thus, the ring 10 comprises a complementary coupling means for the shutter blades to inpart oppositely directed translational movement to the blades 2 and 4.

The first shutter blade 2 has, in the arrangements as illustrated, in the right hand half of the blade, an opening therethrough which is a circular opening 24 but with a substantially triangular extension 26 of the opening 24 extending radially of the circular opening and in the direction of translational movement of the shutter blade. Similarly, the shutter blade 4 has, in the left hand half of the blade, a substantially identical opening 28 having a triangular extension 30 extending radially thereof and in the direction of the motion of the blade. It may be seen that in the illustrated embodiment, the two blade members 2 and 4 are structurally identical. In operating position however one blade is rotated 180° with respect to the other. As positioned in the illustrated embodiment, the two traingular extensions 26 and 30 of the two openings extend toward each other but are spaced apart a distance sufficient to prevent the leakage of light through the shutter when the shutter is in a closed position as shown in FIG. 1A. The two shutter blades 2 and 4 and the driving ring 10 are mounted in a suitable support structure 32 which comprises a part of the lens barrel assembly for the camera, as will be seen more clearly hereinafter.

In FIG. 1B the shutter blades are shown in a partially open position. The tang 12 of the ring 10 has moved toward the left. The engagement of the pins 18 and 14 with the associated slots 20 and 16 respectively has carried the two shutter blades to a position whereat the openings 24 and 28 in the two shutter blades respectively overlap allowing a small amount of light to be admitted past the shutter blades. In FIG. 1C the tang 12 of the ring 10 has moved to its extreme left hand position carrying the shutter blades to a fully opened condition with the two circular portions of the openings 24 and 28 in alignment.

Figure 2:
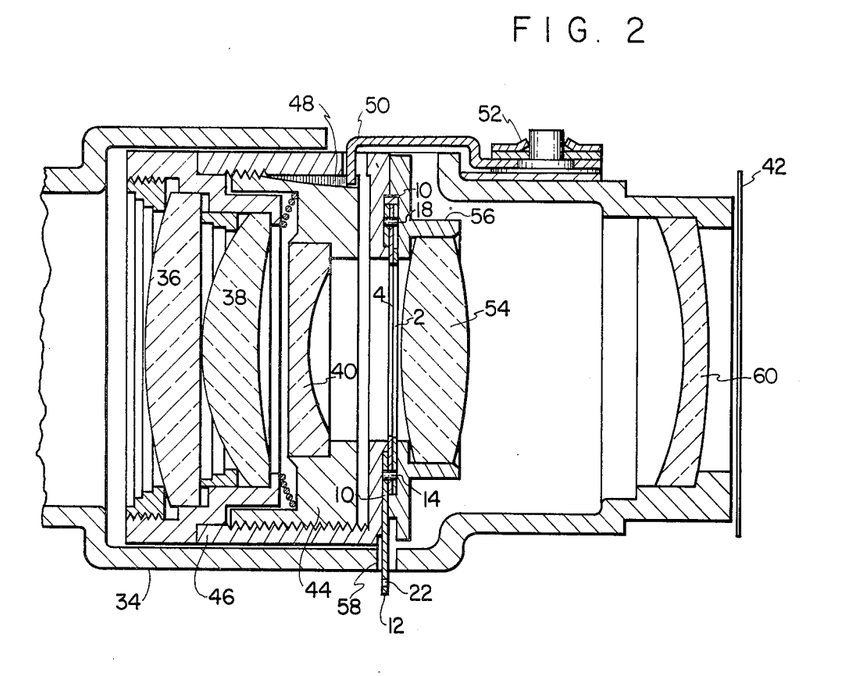
FIG. 2 is a cross-sectional view of the lens system for the camera of the present invention in which the shutter blade structure shown in FIG. 1 is housed.

In FIG. 2 there is shown a side view of a lens barrel apparatus for a camera constructed in accordance with the present invention and which provides a mounting structure for the shutter-iris combination features which have been discussed in connection with FIGS. 1A through 1C, herein above. The lens barrel includes a housing member 34 in which is mounted a first and second fixed lens elements 36 and 38. Behind the fixed lens elements 36 and 38 there is mounted a moveable lens element 40 which may be moved axially to effect a focusing of an image of an object on the focal plane 42 of the camera at which a film will be placed when the camera is put into operation. The moveable lens 40 is supported in a moveable lens support member 44 for movement along the optical axis of the lens system. The lens support member 44 is provided with a finely threaded outer periphery which matches an internally threaded sleeve 46 fixed within the lens barrel housing member 24. The upper portion of the support member 44 is provided with a number of gear teeth 48 which meshes with the teeth of a focusing rack member 50. As will appear more clearly hereinafter, the rack member 50 is arranged to be moveable in a direction transverse to the optical axis of the lens system. At least one fixed sliding support means 52 for the member 50 is provided on the exterior portion of the lens barrel housing member 34. A fourth lens element 54 is supported in spaced relation behind the moveable element 50 and it is also a fixed lens element. The lens element 54 is mounted in a collar 56 which is, in turn, secured by suitable means to the rear face of the sleeve member 46. The rear surface of the sleeve 46 and the front surface of the collar 56 are provided with recesses for supporting and guiding the elements of the shutter mechanism illustrated in FIGS. 1A through 1C. Whereas the shutter blades 2 and 4 are constrained to oppositely directed translational motion, the ring 10 is constrained to a rotational motion about a virtual axis which is concentric with the optical axis of the camera. As illustrated in FIG. 2 of the tang 12 of the driving ring 10 extends through an opening 58 in the housing member 34. A fifth lens element 60 is spaced from the lens element 54 by a substantial distance at the rearmost portion of the lens barrel housing member 34 and adjacent to the focal plane 42. The last mentioned lens 60 serves the purpose of flattening the image at the focal plane.

Figure 3:
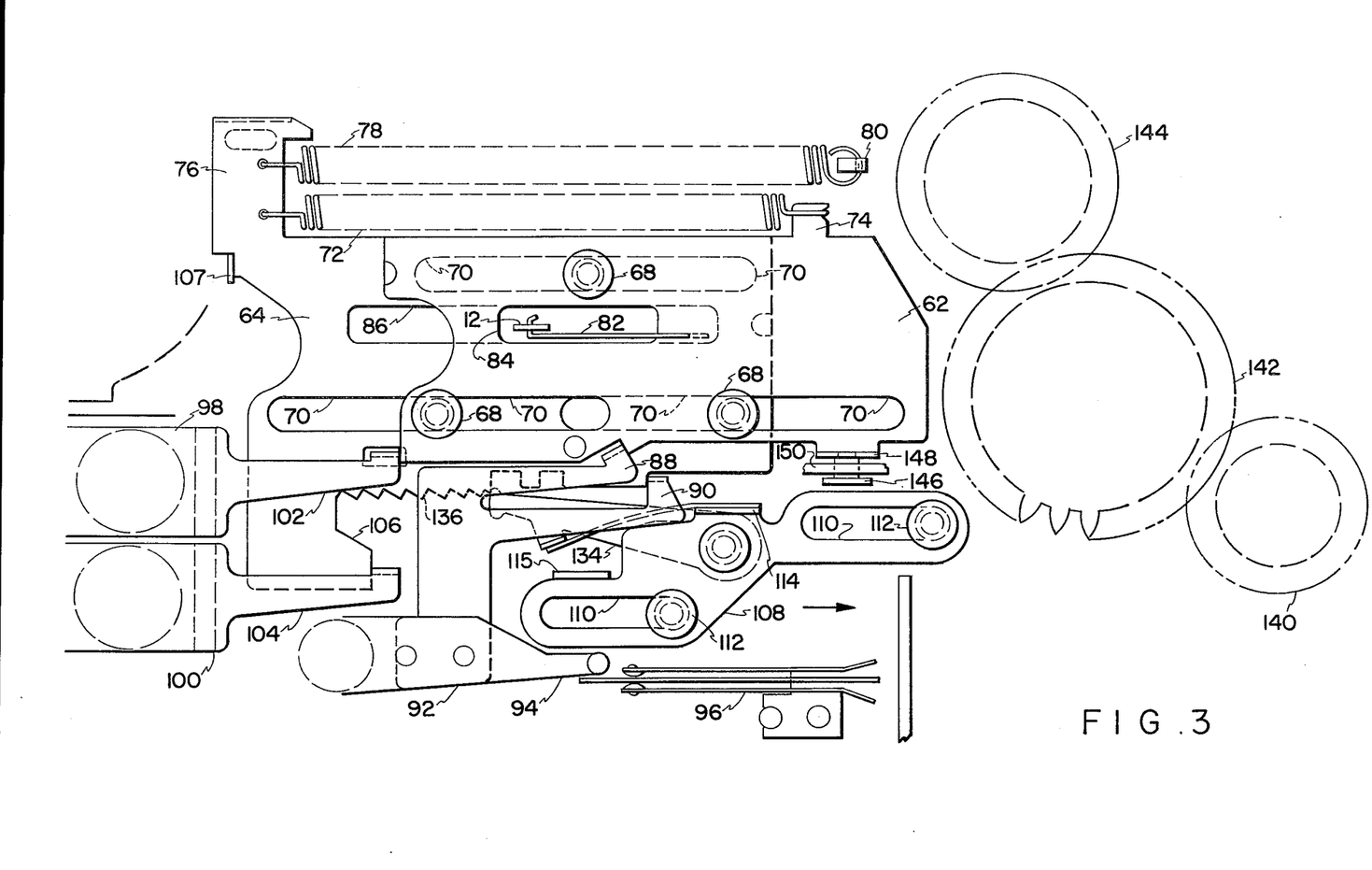
FIGS. 3, 4 and 5 are orthogonal views of portions of the control mechanism for the camera constructed in accordance with the present invention.

In FIG. 3 there is shown a suitable mechanism for controlling the operation of the shutter blades illustrated in FIGS. 1A through 1C. Such a shutter operating assembly includes a first driving plate 62 and a second driving plate 64. Both of the driving plates 62 and 64 are arranged to be moved in translation in planes parallel to each other and perpendicular to the plane of the shutter blades. To this end, a fixed structural member 66 within the camera body (shown most clearly in FIG. 4) is provided with a plurality of guide pins 68 (three being shown). These guide pins 68 cooperate with corresponding guide slots 70 in each of the two plates 62 and 64 to support and define the path of movement for the two plates. The first plate 62 is coupled to the second plate 64 by a spring 72. The spring 72 extends between a projection 74 on the first plate 62 and an extension 76 on the plate 64. A second spring 78 is connected between the extension 76 and a fixed boss 80 extending from the structural element 66. In the embodiment constructed in accordance with the present invention, the spring 72 is relatively weak compared to the spring 78 for reasons that will appear hereinafter. A relatively stiff coupling member 82 is secured to the first driving plate 62 and extends into a slot 84 therein. A similar but longer slot 86 is formed in the second plate 64. The free end of the coupling member 82 extends through the hole 22 in the end of the tang 12 of the shutter driving ring 10. As the plate 62 moves back and forth between its limits, it produces a corresponding motion of the tang 12, resulting in an opening and closing of the shutter blades 2 and 4. In the illustrated embodiment, as seen in FIG. 3, the plates 62 and 64 are shown in the cocked, or ready to fire, position with the shutter closed. The first plate 62 is held in that position, against the urging of the spring 72 by a first latch member 88 in engagement with a correlated notch along the edge of the plate 62. Similarly, the plate 64 is held in its extreme left hand position, against the urging of the spring 78, by a second latch member 90 in engagement with a shoulder on the lower edge of the plate 64. The two latch members 88 and 90 may, and are illustrated as, comprising two separate latch member arms of a single latch assembly 92 which may, in turn, be coupled to the external shutter release button controllable by the operator of the camera. An extension 94 on the latch assembly is positioned to operate a double-pole, single-throw switch 96. The function of the switch 96 will be discussed hereinafter.

In addition to the latch assembly 92, a first and a second solenoid latch 98 and 100, respectively, also cooperate to retain the plates 62 and 64 in their cocked position. The first solenoid 98 has a latch arm 102 which is arranged to butt against the end of the plate 62 to prevent its forward motion until the arm 102 has been moved out of the path of motion. Similarly, the solenoid 100 has a latch arm 104 which is arranged to engage a projection 106 of the plate 64. The solenoid 98 with its arm 102 is used to delay the beginning of the opening of the shutter mechanism after the actuation of the shutter release button by the operator, as will be more fully set forth hereinafter. The solenoid 100 with its arm 104 is under the control of a light responsive automatic exposure control circuit, to be discussed hereinafter. As the first driving plate 62, after its release, begins to move toward the left under the influence of the spring 72, the shutter blades are moved toward an open position as illustrated in FIGS. 1B and 1C.

Figure 9:
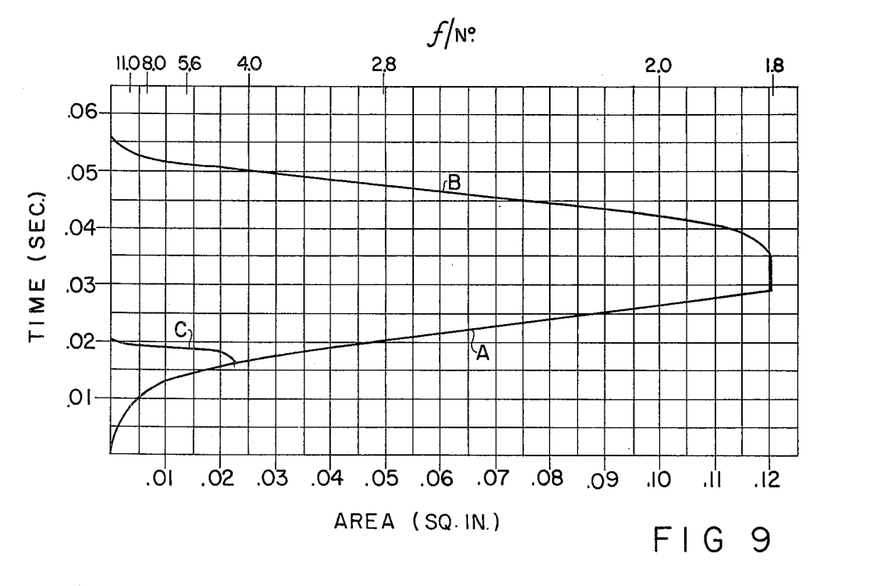
FIG. 9 is a graph illustrating the operation characteristic of a part of the apparatus constructed in accordance with the present invention.

In accordance with the present invention, the relatively weak spring 72 allows the mass inertia of the two shutter blades, the first driving plate 62 and the associated coupling means to effect a relatively slow opening time for the shutter blades, on the order of one thirtieth of a second from fully closed to fully open. The velocity characteristic of a shutter-iris combination constructed in accordance with the present invention has been determined to follow an exponential curve. That is, the blades move very slowly, at first, and build up in velocity as the shutter blades move toward the fully opened position. Thus, the blades are moving relatively slowly when the small triangular portions 26 and 30 of the shutter openings intersect. Because of the interaction between the velocity characteristic of the shutter blades and the configuration of the shutter blade openings, the aperture characteristic of the shutter during the opening stroke presents a substantially exponential opening area for a relatively small part of the stroke; then a substantially linear rate of change in opening area to the limit of a full open position. That relationship is illustrated by curve A in FIG. 9. The light admitted by the shutter is sensed and, when sufficient light has been admitted to effect a proper exposure of the film in the camera, the solenoid 100 is controlled to release the second driving plate 64. The plate 64 under the urging of the huskier spring 78 moves rapidly to the right carrying the first blade 62 with it, thereby quickly closing the shutter. A turned-up lip abutment 107 at the end of the second driving plate 64 engages the end of the first driving plate 62, causing the first plate 62 to be driven to its original position whenever the second driving plate 64 is actuated, or released. The closing characteristic of the shutter opening is also illustrated in FIG. 9. If a relatively low light situation causes the shutter to move to its full open position, the return stroke will be illustrated by curve B of FIG. 9. On the other hand, if a bright light situation were present, the second shutter driving plate would be released much earlier, thereby terminating the opening stroke of the shutter blades, and rapidly closing the opening long before the shutter blades had moved to a full-open position as represented by curve C of FIG. 9. This operation will be discussed in more detail hereinafter.

Figure 4:
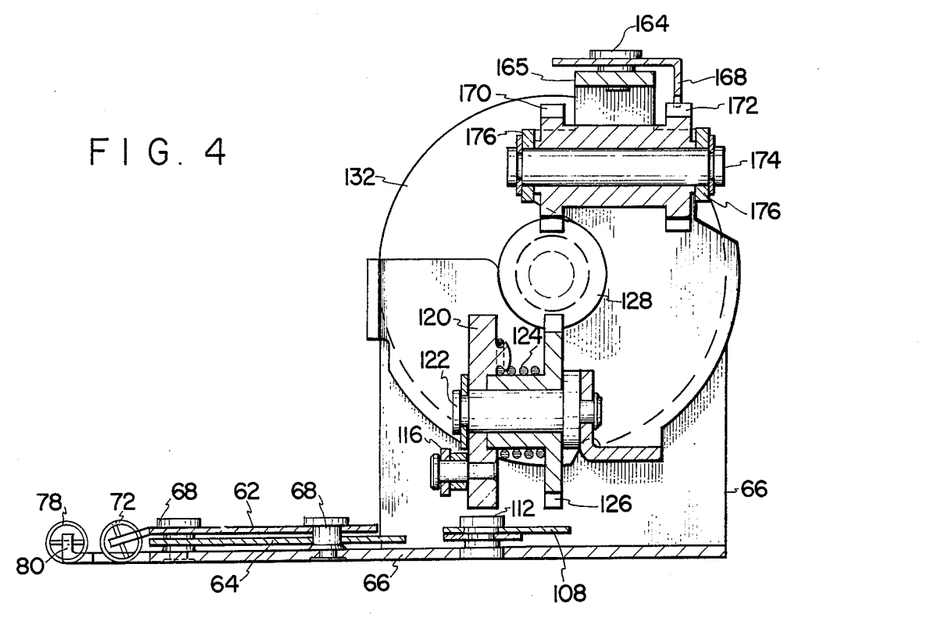
Figure 5:
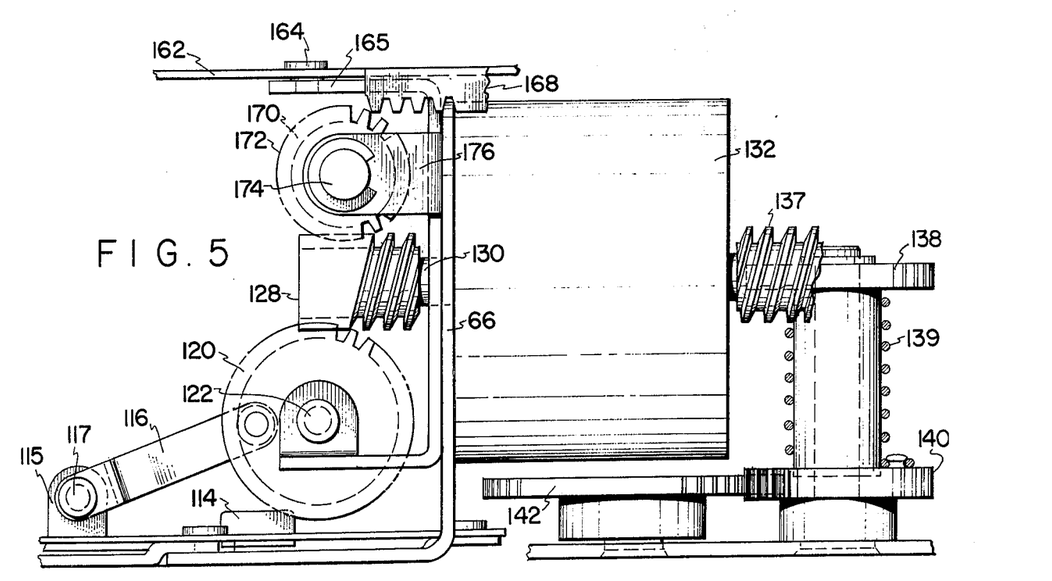

FIGS. 3, 4 and 5 also illustrate means for recocking or resetting the shutter mechanism and simultaneously advancing the film to a next film frame position. To this end, a slide bar 108 in a position substantilly coplanar with the driving plates 62 and 64 is provided. The slide bar 108 is provided with a pair of guide slots 110 which, in turn, cooperate with a pair of guide pins 112. The guide pins 112 are, in turn, secured to the fixed structural member 66. The slide bar 108 has a first tab member 114 and a second tab member 115 which extend at substantially right angles to the main body of the slide bar 108. The tab 115 is connected to a crank arm or link 116 by a coupling pin 117. The other end of the crank arm or link 116 is connected by a pin 118 to a driving crank or wheel 120. The crank, or wheel, 120 is mounted on a shaft 122 and is adapted to be driven through a one-way spring clutch 124 coupling to a driven gear 126. The gear 126 is, in turn, driven from a worm gear 128 on the shaft 130 of a reversible motor 132. When the motor 132 is driven in the direction to cause the spring clutch 124 to be engaged, thereby driving the crank or wheel 120, the cooperative effect of the driving pin 118, the cooperative effect of the driving pin 118, the link 116 and the tab 115 is to produce a reciprocating or oscillatory motion of the slide bar 108. A pawl arm 134, biased by a spring 135 secured to the tab 114, is carried by the slide bar 108 in a position to engage and cooperate with a ratchet 136 formed in one edge of the second drive plate 64.

The motor 132 also includes a second worm gear 137 on the opposite end of the shaft 136 from the worm gear 128. The worm 137 drives a driver gear 138 of a one-way spring clutch 139. A spur gear 140 is driven by the one-way clutch 139 and is positioned to engage and mesh with the teeth of a spur gear 142. It is contemplated that a camera constructed in accordance with the present invention would be of the type adapted to be used with film provided in double-spool cartridges of the so-called instant-load variety. Such cartridges have built into them a driving gear coupled to the take up spool. The spur gear 142 is positioned to engage the driving gear 144 of such a film cartridge.

Figure 7:
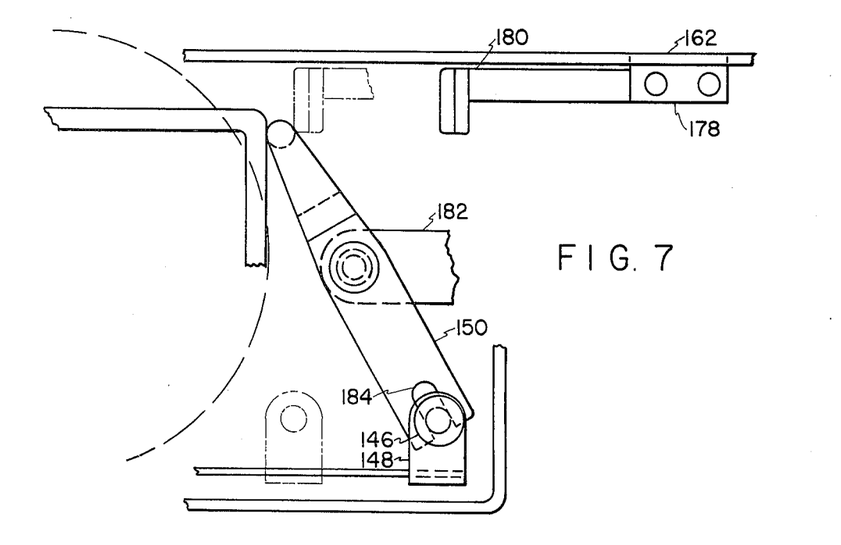
FIG. 7 is an elevational view of a portion of the structural detail of a camera constructed in accordance with the present invention.

One other feature which is shown in FIG. 3 is a stud or boss 146 secured to an upstanding leg 148 at the lower right hand corner of the first driving plate 62. A lever 150, shown in fragmentary form in FIG. 3, but in more detail in FIG. 7, cooperates with the stud 146 in a matter to be hereinafter described.

Figure 6:
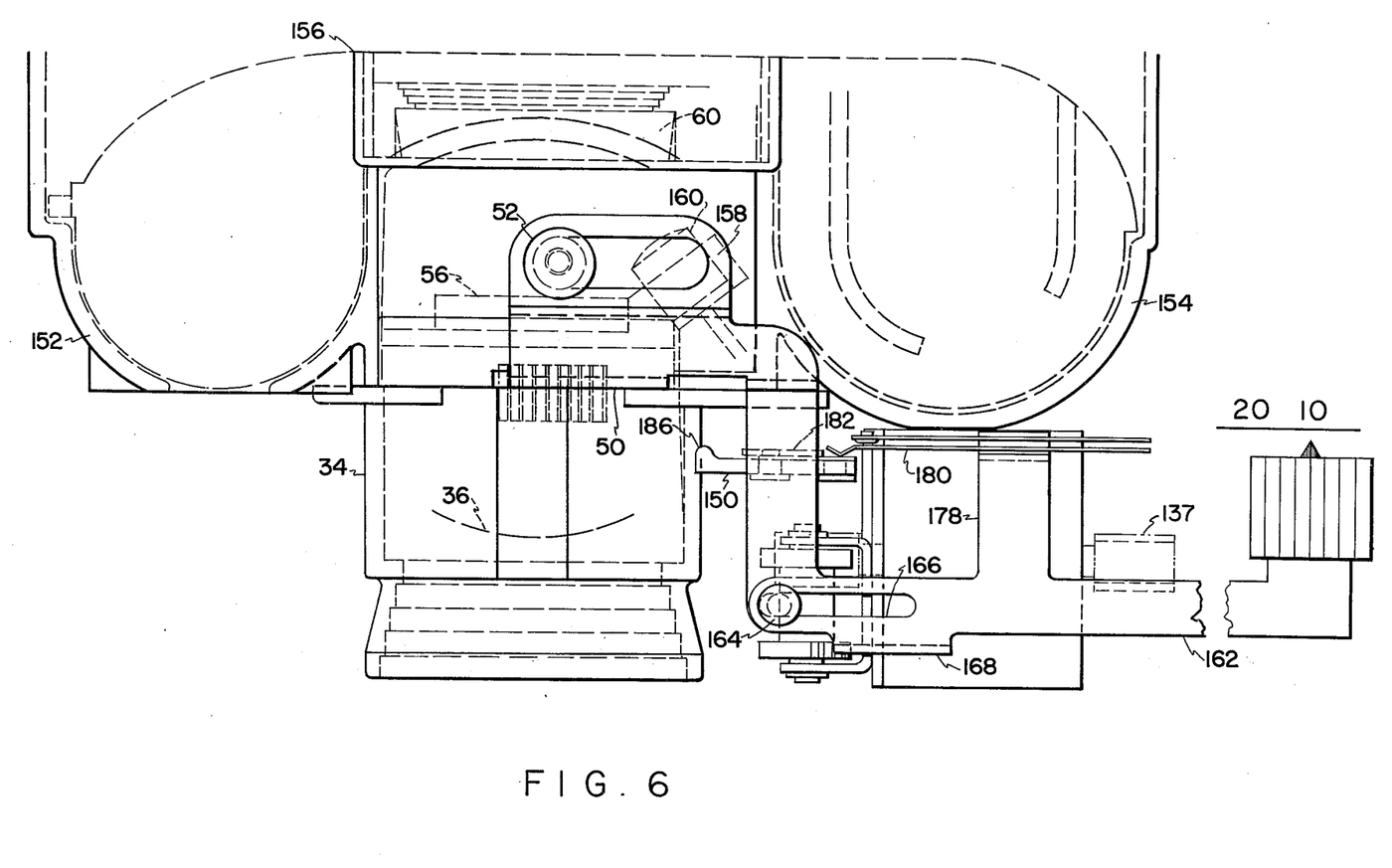
FIG. 6 is a plan view of further portions of the control mechanism of the camera constructed in accordance with the present invention.

In FIG. 6 there is shown a top view of a portion of the operating elements of a camera constructed in accordance with the present invention. The lens barrel 34 is shown in outline form with the front lens 36 and the rear lens 60 schematically represented in phantom. Adjacent to the lens barrel 34 and on opposite sides of the rear half thereof, there is positioned a first and a second film cartridge receptacle 152 and 154, respectively. An associated film cartridge 156 is shown, in phantom, in position in the receptacles. Mounted within the lens barrel assembly adjacent to the collar 56 there is positioned a bracket 158 on which is mounted a light sensitive element 160. The light sensitive element 160 is positioned to respond to light reflected from the film in the camera, the light having been admitted to the film through the opening of the shutter-iris combination. The light sensitive element 160 is the light sensor of the light responsive automatic exposure control circuit to which reference was made hereinbefore.

Referring, for the moment, again to FIG. 2, it was noted that the third lens element of the optical system was a moveable lens 40 mounted in a moveable lens support member 44. Axial movement is imparted to the support member 44 by the cooperative action of a rack member 50 engaging a set of teeth 48 in the upper side of the support member 44. The teeth 48 are shown in phantom in FIG. 6. A cooperating rack 50 forms part of a focus drive arm 162. The arm 162 is supported and guided adjacent the rack 50 by the aforementioned sliding support pin 52 on the upper surface of the lens barrel structure. The drive arm 162 is configured to meet the spatial requirements of the several elements. Thus, the portion of the arm 162 adjacent the rack 50 is laterally off-set with respect to the arm 162. A second guide or support pin 164 is positioned for cooperation with a slot 166 in the main body of the focus drive arm and adjacent to a second or driving rack 168. The guide pin 164 is secured to a leg 165 of a fixed portion 176 of the camera body.

At this point, it is convenient to again refer to FIGS. 4 and 5. In those figures there was illustrated a reversible motor 132 having a shaft 130 on which was mounted a worm gear 128. In addition to driving the gear 126 associated with the recocking of the shutter mechanism, the worm gear 128 also drives a gear 170 which is integral with a focus driving gear 172, both mounted on a shaft 174 which is, in turn, carried on a mounting bracket 176. The gears 170 and 172 and the bracket 176 are also illustrated in FIG. 6. It was previously mentioned that the motor 132 is a reversible motor. It was also previously mentioned that the engagement between the motor and the recocking mechanism was effected through a one-way clutch. The direction of drive which operates the recocking mechanism also causes the gears to 170 and 172 to move in such a direction as to cause the focus drive arm 162 to be moved to the extreme right position as shown in the drawing. This position corresponds, in the illustrated embodiment, with that adjustment of the lens which focuses at infinity. Under the control of the autofocus aspects of the associated circuitry, the motor 132 is caused to move in the opposite direction toward a nearer focus as determined by the referenced autofocus control circuit. In so moving, the gear 172 engages the teeth of the rack 168 causing the focus drive arm 162 to move toward the left. This causes the teeth of the rack 50 to engage the corresponding teeth 48 of the lens support member 44. This movement of the lens support member 44, in cooperation with the threaded engagement between the support member 44 and the sleeve 46 produces an axial movement of the lens element 40, effectively changing the focus position of the lens system. While, in the illustrated embodiment the apparatus has been shown as adjusting the focus of the camera from a starting position of focus at infinity toward a nearer focus position, it will be appreciated that a reverse relationship may be established by a relatively simple rearrangement of the parts. That is, without departing from the spirit and scope of the present invention, the system may be arranged to have the "rest" or starting position of the focus adjusting means at the "near focus" end of the travel with the adjustment being toward a more distant focus position.

The arm 162 also includes a leg member 178 on the end of which is supported a pair of normally opened switch contacts 180. Inasmuch as the switch contacts 180 are mechanically secured to and carried by the arm 162, it is apparent that as the arm moves translationally, the switch contacts 180 will also move in the same direction.

It will be recalled that, in the description of the structure shown in FIG. 3, reference was made to a stud 146 secured to a leg 148 at the lower right hand corner of the first shutter driving plate 62. As was mentioned, a lever 150 was positioned to be operatively associated with the stud 146. That lever 150 is shown in greater detail and in its functional relationship in FIGS. 6 and 7. The lever 150 is positively mounted, at approximately its mid-point on a fix support leg 182. The lower end of the lever 150 is provided with an elongated notch 184 which is dimensioned and positioned to embrace the shaft of the stud 146. The upper end of the lever 150 is configured to have a bulge 186 protruding from one face thereof. As may be seen, as the first shutter driving plate 62 moves in a direction tending to open the shutter-iris combination, the stud 146 also moves in the same direction. Such movement of the stud 146 causes the lever to rotate clockwise about its pivot point. Such rotation of the lever 150 causes the upper end of the lever to move toward the switch contact assembly 180. The bulge 186 on the upper end of the lever 150 is arranged to engage one of the contact members of the switch assembly 180 effecting a switch closure when such engagement is accomplished. As will be shown hereinafter the switch assembly 180 is connected in the control circuit of an electronic flash unit which, it is contemplated, will be built in to the camera structure. It will be remembered that the switch contacts 180 are, themselves, carried on the moveable arm 162 which moves as a function of the focus adjustments of the camera lens. It was mentioned that the rest or starting position for the arm 162 is, in the illustrative embodiment, at the position which corresponds to the focus at infinity. If the arm remains in that position at the time the shutter blade actuating mechanism is operated to open the shutter, the lever 150 will not engage the switch contact until it has reached the position whereat the shutter is in its maximum open position. On the other hand, if the focus mechanism is operated to focus on a nearer object, the switch contacts 180 are moved, along with the focus mechanism, toward the left as viewed in the exemplary drawings. Such movement positions the switch contacts to be engaged by the upper end of the lever 150 at an earlier position in its stroke. The earlier position in the stroke of the lever 150 corresponds, of course, to a smaller opening of the shutter-iris combination. Inasmuch as electronic flash units will admit a fixed amount of light each time it is actuated, and further, that the time duration of such flash is very short, on the order of ½ millisecond or less, the amount of light which is to be admitted to the film resulting from such flash must be controlled by the size of the opening in the shutter-iris combination. Hence, in the apparatus constructed in accordance with the present invention, it is anticipated that it will take approximately 1/30 of a second for the shutter to be driven from a fully closed to a fully opened position, the ½ millisecond flash of light from an electronic flash unit occupies a relatively small portion of that shutter opening time. Therefore, the occurrence of the electronic flash times during the shutter opening cycle, which is correlated with the distance to the object of the photograph as determined by the focusing system thereof, is calibrated to produce a correct amount of light on the film for a proper exposure. As hereinbefore mentioned, the focus system may be made to operate in the reverse order, i.e., adjustment being from a near focus position toward a more distant focus position. In that event, the timing mechanism for the actuation of the flash unit must also be reversed in order that the actuation of the flash unit remain coordinate with the opening of the shutter blades as a function focus position.

Hereinbefore, reference was made to the solenoid 98 and that its purpose was to delay the start of the opening of the shutter-iris combination until such time as other preliminary functions have occurred. It may now be seen that those preliminary functions include the operation of the automatic focusing system as herein described. In other words, it would not be desirable to have the shutter begin opening while the automatic focusing arrangement is accomplishing the focusing of the camera. Therefore, under the control of the automatic focusing arrangement, when the focusing of the camera has been accomplished, a control signal causes the solenoid 98 together with its latch arm 102 to move out of the path of the driving plate 62, thereby allowing the shutter to begin opening.

Figure 8:
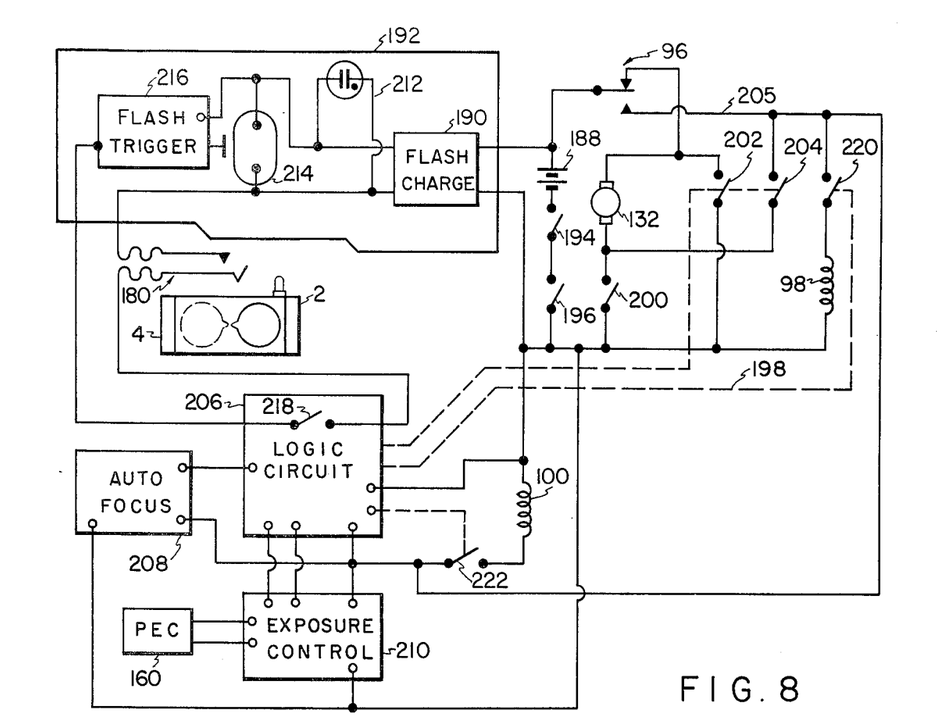
FIG. 8 is a schematic representation of electronic circuitry for controlling the operation of the camera in accordance with the present invention.

Reference has also been made hereinbefore to control circuitry for effecting the several desired control functions. In FIG. 8 there is shown a schematic representation of a suitable circuit arrangement for accomplishing the desired control functions. The details of a particular circuit arrangement of the type herein referenced, is shown and claimed in the aforementioned copending application of Francis T. Ogawa for Control Circuit. In the circuit shown in FIG. 8, a battery 188 supplies power for the entire system. A positive terminal of the battery 188 is connected to the moveable contact of the previously mentioned single-pole, double-throw switch 96. It will be recalled that the switch 96 is coupled to the shutter release button, not shown. The positive terminal of the battery 188 is also connected to the energizing circuit or flash charge circuit 190 of a flash unit 192. The negative terminal of the battery 188 is connected through a first switch 194 and a second switch 196, connected serially, to a negative bus 198. A second terminal of the flash charge unit 190 is also connected to the negative bus. The normally closed contact of the switch 96 is connected to one terminal of the reversible motor 132. The other terminal of the motor 132 is connected through a switch 200 to the negative bus 198. The switch 200 is arranged to sense when a film frame is properly located in the camera in a position to be exposed to a light image. To this end, it is noted that film packaged in the aforementioned quick-load cartridges is provided with a marginal perforation at selected positions along the edge of the film to indicate the proper alignment of a film frame, as before mentioned. It is contemplated that the switch will be open, as shown, whenever the film is properly located in the camera in a position to be exposed. It is further contemplated that the operation of the shutter mechanism will be effective to reclose the switch 22 upon the actuation of the picture taking process. It is contemplated still further that the switch 194 will be normally opened until the camera is made ready to take a picture. In this respect, the switch 194 may be correlated to any preliminary operation of the camera such as the positioning of a retractable view finder, not shown. That is, when such a retractable view finder is extended to its operative position, the switch 194 will be closed. The switch 196 is envisioned as a safety inter lock switch which may be responsive to the opening of a door or closure member giving access to the film cartridge chamber. The opening of the switch 196 whenever the access door is opened will prevent the inadvertent actuation of the camera mechanism during such open period.

It will be noted that the first mentioned terminal of the motor 132 is also connected through a switch 202 to the negative bus while the other terminal of the motor 132 is connected through a second switch 204 to a positive bus 205 connected, in turn, to the normally opened contact of the switch 96. The switches 202 and 204 are illustrated as being ganged together and under the control of a logic circuit 206. It will be appreciated that while the switches 202 and 204 have been illustrated as being mechanical switches the showing is merely illustrative; the switches may well be, and preferably are, solid state switching means.

Considering the circuit as thus far described, assuming the switches 194 and 196 are both closed and assuming that a picture has just been taken, the switch 200 will be closed and the switch 96 will be in the position shown. Under these circustances the motor 132 will operate in the direction to engage the clutch 124 (FIG. 4) thereby actuating the recocking and film advance mechanism. The motor will continue to operate in this direction until such time as the switch 200 is opened by the occurrence of the indicator perforation in the film. The apparatus would then be in condition to initiate the taking of a subsequent picture.

Let us now consider the other elements of the circuit illustrated. There is provided an automatic focus sensing means 208 which may be any of a number of suitable focus sensing and signaling means. It will be seen that the automatic focus means 208 is also energized whenever the moveable contact of the switch 96 is moved to its lower position in contact with the positive bus 205. The automatic focus apparatus 208 will supply a signal to the logic circuit 205 whenever the desired focus condition obtains. The logic circuit 206 is designed to present, in a carefully timed correlated relationship, the several control signals necessary to effect the proper functioning of the camera apparatus.

In addition to the automatic focus apparatus supplying a control signal to the logic circuit 206 there is also an exposure control circuit 210. As was previously mentioned a light sensitive element 160, or photo electric cell is provided. This light sensitive element forms a part of the exposure control circuit 210. Again, the exposure control circuit is also energized whenever the moveable contact of the switch 96 is closed on the positive bus 205. The exposure control circuit is arranged to supply two distinct signals to the logic circuit. One signal transmitted from the exposure control circuit to the logic circuit is in the nature of an anticipatory signal to indicate whether or not sufficient light is present to take a proper photograph without the assistance of auxiliary light. The other signal transmitted from the exposure control circuit to the logic circuit is a signal indicative of the fact that enough light has been received to effect a proper exposure. The flash unit 192 previously mentioned includes, in addition to the flash charge circuit 190, an indicator light 212, a flash tube 214 and a flash trigger circuit 216. The indicator 212 may be of a neon bulb type connected across the output of the flash charge unit to indicate that sufficient charge has been established to effect a proper flash in the flash tube 214. The trigger circuit 216 is connected serially with the switch 180 previously mentioned and a switch 218 within the logic circuit. The switch 218, may be, of course, and preferably is a solid state switch. The switch 180, it will be remembered, is operated by the lever 150 and the operation of the switch is a function of both the focus adjustments and the operation of the shutter blades 2 and 4.

It was previously mentioned that one of the signals transmitted from the exposure control circuit 210 to the logic circuit 206 is an anticipatory signal indicative of whether or not sufficient light is present to allow a proper photograph without auxiliarly light. That anticipatory signal is arranged to occur very early in the opening stroke of the shutter blades. For example, at about 3 milliseconds after the start of the opening stroke (see FIG. 9), the shutter-iris has opened to $f/11$. The anticipatory signal, in the apparatus constructed in accordance with the present invention, is caused to occur at that point. If the signal is such as to indicate that sufficient light does exist, the switch 218 will remain open and a subsequent closure of the switch 180 will have no effect on the flash unit. On the other hand, if the signal transmitted to the logic circuit from the exposure control circuit indicates that insufficient light exists to allow a proper photograph without the auxiliary lights, the switch 218 will be closed. With the switch 218 closed, the subsequent closure of the switch 180 causes the flash unit to be triggered, supplying the necessary auxiliary light. Again it will be remembered that the timing of the closure of the switch 180 is correlated with the focal distance to the object thereby assuring a proper amount of light admitted to the cell under whatever distance condition may exist up to the range limit of the flash unit.

When the automatic focus apparatus 208 has been energized, the motor 132 will also be energized through the closure of the switches 202 and 204 and will drive in a direction to effect the focus adjustment of the lens of the camera. When the automatic focus apparatus 208 has detected that a proper focus adjustment has been accomplished, a signal is sent to the logic circuit which opens the switches 202 and 204, and actuates a switch 220 connected in series with the solenoid 98 whereby to effect a release of a first shutter blade driving plate 62. Again, while the switch 220 has been illustrated as a mechanical switch it may be, and preferably is, a solid state switching device.

It will be recalled that in the discussion of the exposure control circuit 210 it was stated that a second signal was transmitted from the exposure control circuit to the logic circuit 206. That second signal signifies that enough light for a proper photograph has been received. When that signal has been received, the logic circuit controls the actuation of a switch 222 serially connected with the solenoid 100 to effect the release of the second shutter driving plate 64, thereby closing the shutter-iris combination. Again the switch 222 may also be a solid state switch. As soon as the shutter-iris combination has been closed, the switch 200 will be closed. The closure of that switch, and the release of the switch 96 to return to its normally closed side, causes the motor 132 to be energized to drive in the direction to advance the film and recock the camera.

Thus, it may be seen that there has been provided, in accordance with the present invention, an improved automatic camera which features a fully automatic shutter-iris combination operating as a programmed shutter system, which features programming means for automatically controlling the operation of auxiliary light means, means for automatically focusing the camera on a selected object, means for automatically cocking the shutter drive means and for advancing the film in the camera to a next film frame position, and means for correlating the operation of all of the foregoing features.

The embodiments of the invention in which an exlusive property or privilege is claimed are defined as follows:

1. In an automatic photographic camera, the combination comprising;
   a shutter-iris combination including a first shutter blade and a second shutter blade, each blade having a configured opening,
   complementary coupling means coupled to said first and second blades for imparting oppositely directed translational motion to said blades,
   first driving means coupled to said coupling means for moving said shutter blades in said oppositely directed translational motion in a shutter-opening direction,
   second driving means coupled to said first driving means for returning said first driving means to its original position and thereby to move said shutter blades in said oppositely directed motion in a shutter-closing direction,
   programmatic control means for controlling the actuation of said second driving means, said programmatic control means including a light sensing means operative in response to light transmitted through the opening of said shutter to produce a first signal indicative of the exposure of a film in said camera to a predetermined amount of light, exposure control means operative in response to said first signal to produce an exposure control signal, and means operative in response to said exposure control signal to actuate said second driving means.

2. The combination as set forth in claim 1 and further including an electronic flash light unit, and wherein means are provided for producing an anticipatory control signal indicative of an insufficiency of ambient light for a proper exposure of a film in said camera,
   said means for producing said anticipatory signal including means for sampling ambient light, means for correlating the actuation of said sampling means with the translational motion of said shutter blades to actuate said sampling means near the beginning of said shutter-opening motion,
   means for triggering said flash light unit to emit a flash of auxiliary light, and means responsive to said anticipatory signal for enabling said triggering means.

3. In an automatic photographic camera, the combination comprising;
   a shutter-iris combination including a first shutter blade and a second shutter blade, each blade having a configured opening, complementary coupling means coupled to said first and second blades for imparting oppositely directed translational motion to said blades, first driving means for moving said shutter blades in said oppositely directed translational motion in a shutter-opening direction, said first driving means including a first driving plate member, means for constraining said first driving plate member to translational movement in a plane normal to the plane of said first and second shutter blades, means connecting said first driving plate to said complementary coupling means in driving relation thereto, second driving means coupled to said first driving means for moving said shutter blades in said oppositely directed translational motion in a shutter-closing direction, said second driving means including a second driving plate member means for constraining said second plate member to translational movement in a plane and direction parallel to said first driving plate means, first and second driving spring means, said first spring means being relatively weak with respect to said second spring means, said first spring means being coupled between said first driving plate means and said second driving plate means to urge said first driving plate means in a direction to impart motion to said shutter blades in said shutter-opening direction when said first driving means is actuated, said second spring means being coupled between said second driving plate means and a fixed reference point to urge said second driving plate means in a direction to return said first driving plate means toward its original position when said second driving means is actuated, thereby to impart motion to said shutter blades in said shutter-closing direction, and programmatic control means controlling the actuation of said first and second driving means.

4. The combination as set forth in claim 3 wherein said programmatic control means includes light sensing means operative in response to light transmitted through said shutter-opening to produce a first signal indicative of the exposure of a film in said camera to a predetermined amount of light, exposure control means operative in response to said first signal to produce an exposure control signal, and means operative in response to said exposure control signal to actuate said second driving means.

5. The combination as set forth in claim 4 and further including an electronic flash light unit, and wherein means are provided for producing an anticipatory control signal indicative of an insufficiency of ambient light for a proper exposure of a film in said camera, means for triggering said flash light unit to emit a flash of auxiliary light, and means responsive to said anticipatory signal for enabling said means for triggering said light unit.

6. The combination as set forth in claim 4 wherein said means for producing said anticipatory signal includes means for sampling ambient light, means for correlating the actuation of said sampling means with the translational motion of said shutter blades to actuate said sampling means near the beginning of said shutter-opening motion.

7. An automatic photographic camera comprising in combination, an adjustable focusing lens system for focusing an image of an object onto the surface of a film in said camera, a shutter-iris combination including a first shutter blade and a second shutter blade, each blade having a configured opening, first driving means for moving said shutter blades in oppositely directed translational motion in a shutter-opening relationship, light sensing means operative in response to light transmitted through said shutter-opening and reflected from the surface of the film to produce a first signal indicative of the exposure of said film to a predetermined amount of light, exposure control means operative in response to said first signal to produce an exposure control signal, said driving means for driving said shutter blades in shutter-closing relationship, means responsive to said exposure control signal for actuating said second driving means, reversible motive means, means for energizing said motive means in a first direction to effect a focusing of said adjustable lens system, focus responsive means for producing a second signal indicative that a condition of focus has been established, and means operative in response to said second signal to de-energize said motive means at said condition of focus, and further means operative in response to said second signal for delaying the operation of said first driving means until the occurrence of said second signal.

8. A camera as set forth in claim 7 and including means for energizing said motive means for operation in a second direction, means responsive to the operation of said motive means in said second direction for priming said second driving means for operation and advancing a film in the camera to a next film frame position.

9. A camera as set forth in claim 8 and including a one-way clutch means coupled between said motive means and said means responsive to the operation of said motive means in said second direction.

10. A camera as set forth in claim 7 wherein said first driving means includes inertial retard means for retarding the translational motion of said first and second shutter blades and thereby the shutter opening.

11. A camera as set forth in claim 8 and including complementary coupling means coupled to said first and second shutter blades for imparting said oppositely directed translational motion thereto, wherein said first driving means includes a first driving plate member, means for constraining said first plate member to translational movement in a plane normal to the plane of said first and second shutter blades, means connecting said first driving plate means to said complementary coupling means, wherein said second driving means includes a second driving plate member, means for constraining said second plate member to translational movement in a plane and direction parallel to said first driving plate means, first and second driving springs means, said first spring means being relatively weak with respect to said second spring means, said first spring means being coupled between said first driving plate means and said second driving plate means to urge said first driving plate means in a direction to impart motion to said shutter blades in said shutter-opening relationship when said first driving means is actuated, said second spring means being coupled between said second driving plate means and a fixed reference point to urge said second driving plate means in a direction to return said first driving means is actuated, thereby to impart motion to said shutter blades in said shutter-closing direction.

12. A camera as set forth in claim 7 and including an electronic flash light unit, and wherein means are provided for producing an anticipatory control signal indicative of an insufficiency of ambient light for a proper exposure of said film, means for triggering said flash light unit to emit a flash of auxiliary light, and means responsive to said anticipatory signal for enabling said means for triggering said light unit.

13. A camera as set forth in claim 12 and including means for adjusting the temporal occurrence of the actuation of said means for triggering said light unit in accordance with the focus adjustment of said focusing element.

14. A camera as set forth in claim 7 characterized by the inclusion of an electronic flash light unit, having means for triggering said flash light unit into operation, said exposure control means including sampling means for sampling ambient light, means for correlating the actuation of said sampling means with the translational motion of said shutter-iris combination in the shutter-opening direction to actuate said sampling means near the beginning of said shutter-opening, said sampling means being operative to produce an anticipatory signal indicative of an insufficiency of ambient light for a proper exposure of said film, and said means for triggering said flash light unit into operation being responsive to said anticipatory signal to enable said triggering means, 15. A camera as set forth in claim 14 characterized by the inclusion of means for controlling the actuation of said triggering means in timed relationship with further translational motion of said shutter-iris combination in said shutter-opening direction, said timed relationship being adjustable in accordance with the focus adjustment of said focusing element.

16. In a photographic camera, the combination comprising;

a shutter-iris combination including a first shutter blade and a second shutter blade, each blade having a configured opening, said blades being translationally moveable in opposite directions between a first position whereat said openings are out of alignment with respect to each other and other positions whereat said openings are at least partially in alignment with each other to admit a controlled amount of light through opening to the interior of said camera, complementary coupling means coupled to said first and second shutter blades for imparting said oppositely directed translational movement to said blades, said complementary coupling means comprising a ring member having diametrically positioned radial tabs, and a radial drive tang extending therefrom, said ring member being constrained to rotational movement about a virtual axis concentric with the optical axis of said camera, first pin means coupling said first shutter blade to one of said tabs and second pin means coupling said second shutter blade to the other of said tabs, and driving means connected to said radial tang of said ring member for effecting said rotational motion to said ring member whereby to impart said translational motion to said shutter blades, 17. The combination as set forth in claim 19 wherein said driving means includes a first driving plate member and a second driving plate member, means for constraining said first plate member for tranlational movement in a plane normal to the plane of said shutter blades, means connecting said first driving plate to said tang of said ring member, means for moving said first driving plate means in a first direction to impart said oppositely directed translational motion to said shutter blades in a shutter-opening direction, a second driving plate member, means for constraining said second plate member for translational movement in a plane and direction parallel to that of said first driving plate member, said second driving plate member being coupled to said first driving plate member for returning said first driving plate member to its original position, thereby to move said shutter blades in said oppositely directed motion in a shutter-closing direction, and means for moving said second driving plate member in a direction to effect said returning of said first driving plate member to its original position.

18. The combination as set forth in claim 17 and including signal controlled motive means coupled to said second driving plate member for resetting said second driving plate member to its original position, and including further means coupled to said motive means for advancing a film in said camera to a next film frame position simultaneously with the resetting of said second driving plate member.

* * * * *

UNITED STATES PATENT OFFICE
CERTIFICATE OF CORRECTION

PATENT NO. : 3,928,859
DATED : Dec. 23, 1975
INVENTOR(S) : Dean M. Peterson

It is certified that error appears in the above-identified patent and that said Letters Patent are hereby corrected as shown below:

Column 15, line 10, after the word "driving" insert

-- plate -- ;

Same column, same line, after the word "means" insert

-- towards its original position when said second driving means -- .

Column 16, line 25, cancel "19" and insert -- 16 -- .

Signed and Sealed this twenty-second Day of June 1976

[SEAL]

Attest:

RUTH C. MASON
Attesting Officer

C. MARSHALL DANN
Commissioner of Patents and Trademarks